(12) United States Patent
Kraus

(10) Patent No.: US 6,253,421 B1
(45) Date of Patent: Jul. 3, 2001

(54) PLASTIC HOLDING STRAP WITH ELASTIC LOCKING ELEMENT FOR LOCKING THE HOLDING STRAP BY ENGAGEMENT WITH BUNDLED ARTICLES

(75) Inventor: Willibald Kraus, Gruünstadt (DE)

(73) Assignee: TRW Automotive Electronics & Components GmbH & Co. KG (DE)

(*) Notice: Subject to any disclaimer, the term of this patent is extended or adjusted under 35 U.S.C. 154(b) by 0 days.

(21) Appl. No.: 09/459,249

(22) Filed: Dec. 10, 1999

(30) Foreign Application Priority Data

Dec. 11, 1998 (DE) .......................... 298 22 176 U

(51) Int. Cl.[7] ................. B65D 63/00; F16L 3/00
(52) U.S. Cl. ................. 24/16 PB; 24/17 AP; 248/74.3
(58) Field of Search ................. 24/16 R, 16 PB, 24/17 A, 297, 30.5 R, 30.5 P; 248/68.1, 74.3, 74.2

(56) References Cited

U.S. PATENT DOCUMENTS

| 3,581,349 | * | 6/1971 | Verspieren | 24/16 PB |
|---|---|---|---|---|
| 4,766,651 | * | 8/1988 | Kobayshi et al. | 24/16 PB |
| 5,601,261 | * | 2/1997 | Koike | 24/16 PB X |
| 5,774,944 | * | 7/1998 | Choi | 24/16 PB |
| 5,803,413 | * | 9/1998 | Benoit et al. | 248/74.3 X |
| 5,819,375 | * | 10/1998 | Kastner | 24/16 PB |

* cited by examiner

Primary Examiner—Robert J. Sandy
(74) Attorney, Agent, or Firm—Fay, Sharpe, Fagan, Minnich & McKee, LLP

(57) ABSTRACT

A plastic holding strap (1) is provided for looping around and fastening a bundle of articles, specifically tubes and cables (2, 2') with a profiled strap element (3) having a pair of longitudinal strips (4, 4') and transverse rung members (5). A head member (6) is connected to a first end of the strap element (3) and defines a at least one passage opening (7) and includes an obliquely extending resilient locking element (8) which is selectively embeddable into at least a partial area of one or more of the transverse rung members (5). A holding element (10) is selectively connectable onto an associated support member and is formed integrally with the head member (6) for fastening the plastic holding strap onto the support member. A first portion (12) of the strap element (3) defines a substantially convex region (20) having at least one holding lug (15, 15') formed thereon. The holding lugs are embeddable in corresponding recesses formed in the associated articles to be fastened on the subject holding strap. As the strap element is tightened around the associated tubular objects, the locking element (8) is moved by the objects so that a locking element (8) is extended into the passage opening (7) for engagement with at least one of the transverse rung members (5) locking the strap element relative to the head member (6).

22 Claims, 1 Drawing Sheet

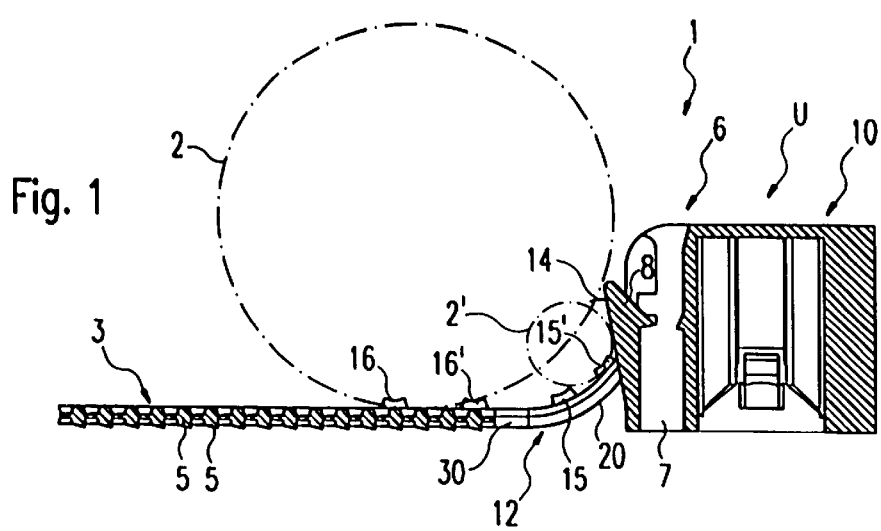
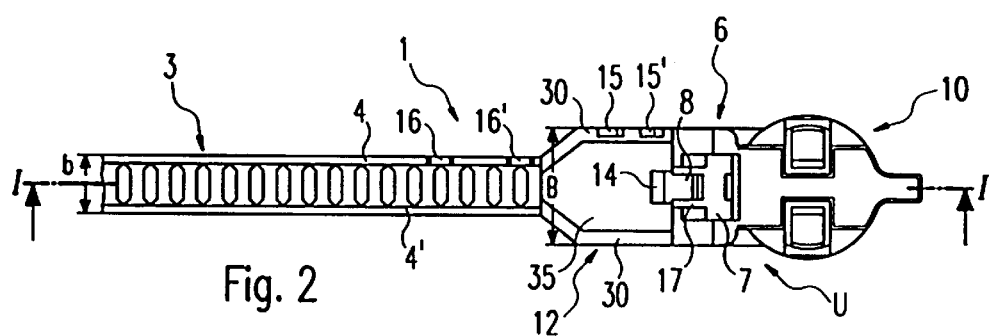
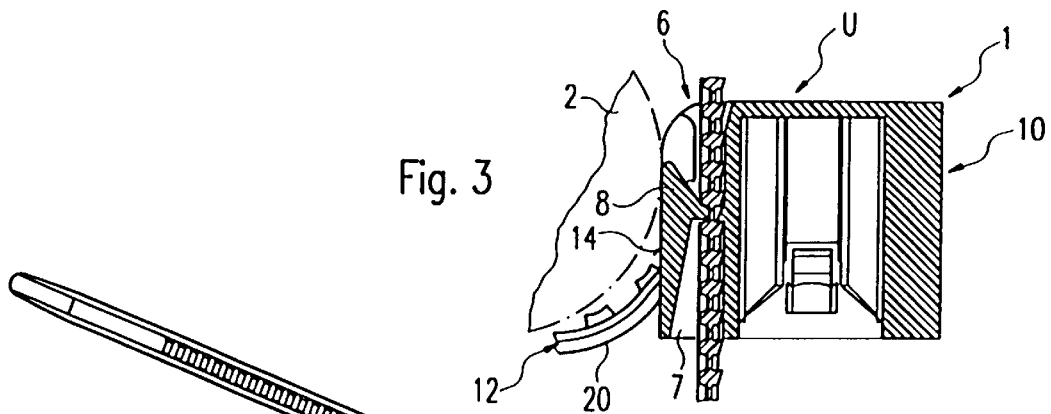
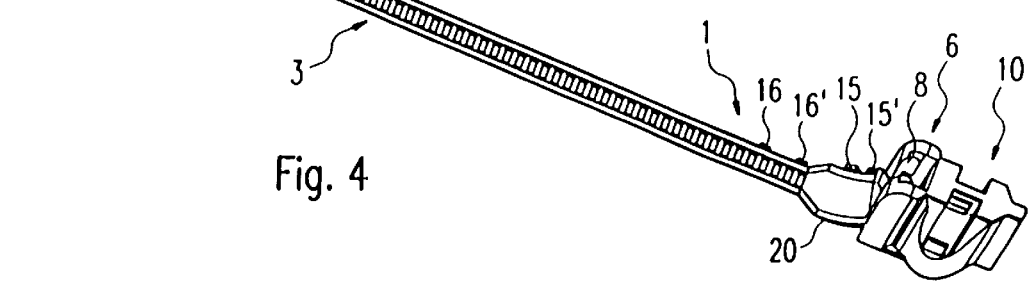

PLASTIC HOLDING STRAP WITH ELASTIC LOCKING ELEMENT FOR LOCKING THE HOLDING STRAP BY ENGAGEMENT WITH BUNDLED ARTICLES

BACKGROUND OF THE INVENTION

The subject invention is directed to the art of plastic holding straps of the type used for looping around, fastening, and bundling cables and other tubular articles to an associated support member and, more particularly, to the art of plastic holding elements of the type including an elongate profiled strap element, a head member connected to a first end of the strap element and defining a passage opening and an elastic locking element selectively movable into the passage opening for locking the strap element relative to the head member.

Plastic holding straps of the type under consideration are commonly used to bundle cables and other elongate objects such as tubes or the like in a secured manner. Typically, the plastic holding straps are formed as a long relatively thin flexible profiled strap element including a pair of spaced apart parallel longitudinal strips that extend along the length of the strap element. A plurality of transverse rung members extend in a spaced apart relationship between the pair of parallel longitudinal strips. One end of the plastic holding element defines a passage opening adapted to accept the other free end of the holding strap therethrough. At least one locking element is disposed within the passage opening for selectively engaging the plurality of transverse rung members. The elastic locking element is typically embeddable relative to the longitudinal strips and transverse rung members.

Holding straps of the type described above are well known in the art. A number of patents including German Patent DE-GM 297 07 757.0 teach improvements to the elastic locking element wherein the element is specially designed in order to enable improved mounting of the strap within the head member.

In some teachings, namely DE OS 38 07 173 and U.S. Pat. No. 3,991,444, improvements are shown that are directed to the transverse rung members extending in a spaced apart relationship between the pair of longitudinal strips. More particularly, in those teachings, the transverse rung members have a circular cross section or are oval in shape.

Although holding straps formed in accordance with the above teachings have met with some success, there remains the possibility that bundled articles subjected to substantial longitudinal tension may become detached from the mounting device. Some articles are shaped in the form of a so called "corrugated tube" wherein one or more elongate grooves are provided along the longitudinal direction of the cable or tube. Even when those articles are bundled using known plastic holding straps, however, there remains the possibility of detachment due to longitudinal tension placed on the bundled articles.

It would be desirable, therefore, to provide a plastic holding strap that is capable of secure mounting of corrugated tubes or other elongate tubes, cables, and other articles provided with a longitudinal groove or corrugation.

Further, it is desirable to provide a plastic holding strap that is particularly well suited for mounting and axially securing tubes, cables, and other articles of the aforementioned type onto an associated support member.

SUMMARY OF THE INVENTION

The subject invention provides a plastic holding strap that is particularly well suited for mounting at least one article having a corrugation or groove provided on its exterior surface. More particularly, the subject invention provides a plastic holding strap including an elongate profiled strap element including a pair of spaced apart parallel longitudinal strips and a set of transverse rung members extending between the pair of parallel longitudinal strips. A head member is connected to a first end of the elongate profiled strap element and defines at least one passage opening adapted to selectively receive a second free end of the elongate profiled strap element therethrough. An elastic locking element is carried on the head member and defines, on opposite sides thereof, an abutment surface and an engagement member. The locking element is positioned relative to the elongate profiled strap element and the head member so that as the elongate profiled strap element is tightened, the associated bundled objects contact the abutment surface and urge the engagement member into the at least one passage opening to thereby interengage and lock with the set of transverse rung members to thereby hold the elongate profiled strap element in place relative to the head member.

In accordance with a further aspect of the invention, at least one holding lug is disposed on the elongate profiled strap element for selective engagement with a corresponding recess formed in the associated bundled objects.

In accordance with a further aspect of the invention, a first portion of the elongate profiled strap element defines a substantially convex region oriented towards the associated bundled objects. Preferably, the at least one holding element is disposed in the substantially convex region.

In accordance with yet a further more limited aspect of the invention, at least one secondary holding lug is carried on a second portion of the profiled strap element adjacent the substantially convex region. The at least one secondary holding lug is adapted for selective engagement with a second corresponding recess defined in the associated bundled objects.

Still further in accordance with the invention, a holding element is formed integrally with the head member as a unitary structure. The holding element adapts the subject plastic holding strap for selective connection onto an associated support member. Preferably, the holding element is adapted to be received onto an associated coarse thread bolt.

It is to be appreciated from the above that the locking element is actuated by contact on its back side with the associated bundled objects. As the strap is tightened, the back side of the locking element is contacted by the bundled objects thereby urging the locking element in a direction towards the passage opening to thereby enable an engagement member carried on an opposite side thereof to interengage with the set of transverse rung members carried on the profiled strap element.

In accordance with the invention, the at least one holding lug and the at least one secondary holding lug acts upon the outer circumference of the associated corrugated tubes or cables to fasten them in a functionally secure position relative to the subject plastic holding strap. In addition, the outer circumference of the associated corrugated tube or cable acts on the back side of the locking element as the strap is tightened to urge the engagement member into connection with the transverse rung members thereby efficiently fastening, in a closed position, the entire holding strap and bundled articles to an associated support member. This assures high functional safety of the holding strap according to the invention.

In accordance with a further aspect of the invention, an area located between the head member and the free end of the elongate profiled strap element is formed in a substantially convex shape oriented towards the associated articles to be retained or held by the strap. Preferably, the substantially convex region has a width that is greater than the width of the remainder of the elongate profiled strap element.

Further in accordance with an aspect of the invention, a pair of holding lugs are provided in close proximity with each other and spaced apart from the substantially convex region. The pair of holding lugs are preferably located on the side of the strap defined by the closed end of the convex region.

In accordance with a further aspect of the invention, the convex region is provided with at least one, preferably a pair, of holding lugs for engagement with a corresponding recess formed in the associated bundled objects.

In accordance with yet a further aspect of the invention, the substantially convex region of the elongate profiled strap element is disposed adjacent the head member and below the area of attachment between the locking element and the head member. In that way, an article resting in the convex region contacts the back side of the elastic locking element. In addition, the locking element may alternatively be disposed in a recess of the head member.

In accordance with a still further aspect of the invention, the head member and holding element are integrally formed as a single unitary construction. Preferably, the holding element is adapted for acceptance onto an associated coarse threaded bolt. Alternatively, the holding element is formed for attachment onto a wide variety of associated support members having various shapes and sizes.

As can be seen from the foregoing, a primary object of the invention is the provision of a holding strap system that includes an elastic locking element that utilizes the tightening forces placed on bundled objects to more securely clamp the elongate profiled strap element in place relative to the head member.

A further object of the invention is the provision of a plastic holding strap having an elastic locking element carried on the head member and defining, on opposite sides thereof, an abutment surface and an engagement member. The abutment surface is positioned so that the bundled articles act thereon as the elongate profiled strap element is tightened. The engagement member is urged inwardly into a passage opening formed in the head member for engagement with transverse rung members of the elongate profiled strap element. As the strap is tightened, the associated bundled articles are urged toward the abutment surface thereby moving the engagement member into the passage opening to securely engage the transverse rung members formed on the profiled strap element.

A further object of the invention is the provision of at least one holding lug disposed on the profiled strap element for selective engagement with a corresponding recess defined in the associated bundled objects.

A still further object of the invention is the provision of a substantially convex region in a portion of the profiled strap element, the convex region being oriented toward the associated bundled objects. Preferably, the convex region has a width that is wider than the width of the profiled strap element.

In accordance with the above, therefore, the subject plastic holding strap is advantageous in ease of use and holding integrity for bundling elongate objects and in connecting the bundled objects onto an associated support member.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiment of which will be described in detail in this specification and illustrated in the accompanying drawings which form a part hereof, and wherein:

FIG. 1 is a side cross-sectional view taken along line I—I of FIG. 2 illustrating the preferred form of the subject plastic holding strap in accordance with the present invention;

FIG. 2 is a top plan view of the plastic holding strap shown in FIG. 1;

FIG. 3 is an enlarged side cross-sectional view of a portion of the plastic holding strap shown in FIG. 1 and illustrating the strap in a partially clamped position; and, FIG. 4 is a perspective view of the plastic holding strap illustrated in FIG. 1.

DETAILED DESCRIPTION OF THE PREFERRED EMBODIMENT

Referring now to the drawings wherein the showings are for the purposes of illustrating the preferred embodiment of the invention only and not for purposes of limiting same, the figures show a holding strap 1 for fastening a bundle of elongate objects 2, 2' to an associated support member (not shown), the holding strap 1 being formed of an elongate profiled strap element 3 including a pair of spaced apart parallel longitudinal strips 4, 4' and a set of transverse rung members 5 extending between the pair of parallel longitudinal strips 4, 4'. A head member 6 is connected to a first end of the elongate profiled strap element 3 as shown and defines at least one passage opening 7 adapted to selectively receive a second free end of the elongate profiled strap element 3 therethrough. A resilient locking element 8 is carried on the head member 6. The locking element 8 defines, on opposite sides thereof, an abutment surface 14 and an engagement member 13. The locking element 8 is positioned relative to the elongate profiled strap element 3 and the head member 6 so that, as the elongate profiled strap element 3 is extended through the at least one passage opening 7 and tightened, the associated bundled objects 2, 2' contact the abutment surface 14 and urge the elastic locking element 8 to right as viewed in FIG. 1. This causes the engagement member 13 to embed within the plurality of transverse rung members 5 as shown best in FIG. 3 to hold the elongate profiled strap element 3 in place relative to the head member 6.

In addition to the above, the subject plastic holding strap 1 includes a holding member 10 preferably integrally formed with the head member 6 as a single unitary structure u. The holding element 10 is selectively connectable onto an associated support member such as a coarse threaded bolt, or other differently shaped or profiled bolts such as cone-shaped members. The holding element 10 may take on any shape as necessary but preferably is formed to conform to the general size and shape of the associated support member (not shown) and to enable mounting the subject plastic holding strap 1 and the associated tubular objects 2,2' thereon.

With continued reference to the figures, at least one holding lug 15 is provided in an area 12 of the holding strap 1 located between the head piece 6 and the strap piece 3. The at least one holding lug 15 is adapted for embedded engagement into one or more grooves or recesses provided in the corrugated tubes or cables 2, 2'. In the preferred embodiment of the subject plastic holding strap shown in the drawings, two holding lugs 15 and 15' are positioned at a distance next to each other in the area 12 which is preferably formed to define a substantially convex region 20. The convex region 20 is oriented towards the associated articles 2, 2' to be mounted on the plastic holding strap. As shown best in FIG. 2, the substantially convex region 20 has a width B which is greater than the width b of the elongate profiled strap element 3.

Preferably, as shown in FIG. 2, a pair of strips 30, 30' are provided whereby at least one of the strips carries at least one of the holding lugs 15, 15'. An interspace 35 is defined between the pair of arched or substantially convex shaped strips 30, 30'. The interspace 35 may be perforated or equipped with a film membrane, or the like, as desired.

As is apparent from FIGS. 2 and 4, the holding lugs 15, 15' are arranged on one side of the substantially convex region 20. In addition to the above, auxiliary holding lugs 16, 16' are provided in an area adjacent the convex region 20. Preferably, the holding lugs 15, 15' disposed in the convex region 20, as well as the auxiliary holding lugs 16, 16' disposed adjacent the lugs 15, 15', dare positioned on the same side of the holding element 1 as best shown in FIG. 1.

As further shown in FIG. 1, the substantially convex region 20 is connected with the head member 6 below the rear side of the elastic locking element 8. In that way, the elastic locking element 8 is actuated by the articles 2, 2' which are fastened and bundled by the plastic holding strap 1.

As shown in FIG. 2, the resilient locking element 8 is arranged in a recess 17 formed in the head member 6. When an associated article 2, 2' such as a corrugated tube or the like is positioned in an upper area of the strap piece 3, it is possible to form a loop around the associated articles in such a manner that the free end of the elongate profiled strap element can be inserted from above the passage aperture 7. After securely latching the strap element 3, the resilient locking element 8 is pressed by the outer circumference of the corrugated tubes or cables 2, 2' from its original position shown in FIG. 1 into the position shown in FIG. 3, whereby an engagement member 13 formed on the front of the elastic locking element 8 extends through a gap between the respective transverse rung members 5 and is embedded there. Thus, the profiled strap element 3 is functionally disposed in a secure position whereby the position of the holding lugs 15, 15' and/or the auxiliary lugs 16, 16' act upon the outer circumference of the corrugated tube or cable members 2, 2' and thus fasten same in a displacement-proof longitudinal direction.

By interaction of the holding lugs 15 and 15' with the resilient locking element 8 as aided by the corrugated tube or cable 2, 2' the subject plastic holding strap achieves a displacement-proof fastening of the respective articles via the holding strap. This ensures, in a simple fashion, a highly functional security of the articles on the holding strap. Accordingly, a holding strap formed in accordance with the present invention is particularly well suited for use in the field of automotive technology.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A plastic holding strap for use in bundling an associated elongate corrugated tubular object, the holding strap comprising:

an elongate profiled strap element including a pair of spaced apart parallel longitudinal strips and a set of transverse rung members extending between the pair of parallel longitudinal strips;

at least one holding lug disposed on the elongate profiled strap element for selective embedded engagement with a corresponding recess defined in said associated corrugated tubular object to prevent relative movement between the corrugated tubular object and the holding strap in a direction along a longitudinal length of the tubular object;

a head member connected to a first end of the elongate profiled strap element and defining at least one passage opening adapted to selectively receive a second free end of the elongate profiled strap element therethrough; and, an elastic locking element carried on the head member and defining, on opposite sides thereof, an abutment surface and an engagement member, the locking element being positioned relative to the elongate profiled strap element and the head member so that when the elongate profiled strap element is moved through the at least one passage opening, the associated bundled objects contact the abutment surface and urge said engagement member into the at least one passage opening for selectively engaging said set of transverse rung members to hold the elongate profiled strap element in place relative to the head member.

2. The plastic holding strap according to claim 1 wherein a first portion of said elongate profiled strap element defines a substantially convex region oriented towards said associated bundled objects.

3. A plastic holding strap for use in bundling an associated object, the holding strap comprising:

an elongate profiled strap element including a pair of spaced apart parallel longitudinal strips and a set of transverse rung members extending between the pair of parallel longitudinal strips, a first portion of the strap element defining a substantially convex region oriented towards the associated object, said convex region having a width B greater than a width b of said elongate profiled strap element;

at least one holding lug disposed on the elongate profiled strap element for selective engagement with a corresponding recess defined in said associated object;

a head member connected to a first end of the elongate profiled strap element and defining at least one passage opening adapted to selectively receive a second free end of the elongate profiled strap element therethrough; and, an elastic locking element carried on the head member and defining, on opposite sides thereof, an abutment surface and an engagement member, the locking element being positioned relative to the elongate profiled strap element and the head member so that when the elongate profiled strap element is moved through the at least one passage opening, the associated bundled object contacts the abutment surface and urges said engagement member into the at least one passage opening for selectively engaging said set of transverse rung members to hold the elongate profiled strap element in place relative to the head member.

4. The plastic holding strap according to claim 3 wherein said at least one holding lug includes a pair of holding lugs carried in a spaced apart relationship on said first portion of said elongate profiled strap element.

5. The plastic holding strap according to claim 4 wherein said pair of holding lugs are carried on a single side of said convex region.

6. The plastic holding strap according to claim 4 further including:
- at least one secondary holding lug carried on a second portion of said elongate profiled strap element adjacent said substantially convex region.

7. The plastic holding strap according to claim 6 wherein said pair of holding lugs and said at least one secondary holding lug are carried on a single side of said elongate profiled strap element.

8. The plastic holding strap according to claim 3 wherein said substantially convex region is connected with said head member at a position adjacent said abutment surface.

9. The plastic holding strap according to claim 3 further including:
- a holding element selectively connectable onto an associated support member, the holding element being formed integrally with said head member.

10. The plastic holding strap according to claim 9 wherein said holding element is adapted for selective connection onto an associated coarse thread bolt.

11. The plastic holding strap according to claim 1 wherein said head member defines a recess and said locking element is disposed in said recess.

12. A plastic holding strap for use in bundling an elongate corrugated object and fastening the bundled object to an associated support member, the holding strap comprising:
- an elongate profiled strap element including a pair of spaced apart parallel longitudinal strips and a set of transverse rung members extending between the pair of parallel longitudinal strips;
- a head member connected to a first end of the elongate profiled strap element and defining at least one passage opening adapted to selectively receive a second free end of the elongate profiled strap element therethrough;
- a holding element formed integrally with said head member and selectively connectable onto the associated support member;
- at least one holding lug disposed on the elongate profiled strap element for selective engagement with a corresponding recess defined in said associated corrugated object to fasten the associated object with the holding strap and prevent relative longitudinal displacement between the object and the holding strap; and,
- an elastic locking element having an elongate abutment surface and carrying an engagement member on a side opposite the abutment surface, the locking element being positioned relative to the elongate profiled strap element and the head member so that when the elongate profiled strap element is tightened, the associated bundled objects contact the abutment surface and urge said engagement member into the at least one passage opening for selectively engaging said set of transverse rung members to hold the elongate profiled strap element in place relative to the head member.

13. The plastic holding strap according to claim 12 wherein a first portion of said elongate profiled strap element defines a substantially convex region oriented towards said associated bundled objects.

14. The plastic holding strap according to claim 13 wherein the at least one holding lug is disposed on the substantially convex region of the elongate profiled strap element for selective engagement with said corresponding recess defined in said associated bundled object.

15. The plastic holding strap according to claim 14 further including at least one secondary holding lug carried on a second portion of said elongate profiled strap element adjacent said substantially convex region.

16. A plastic holding strap for use in bundling an associated corrugated object, the holding strap comprising:
- an elongate profiled strap element including a pair of spaced apart parallel longitudinal strips and a set of transverse rung members extending between the pair of parallel longitudinal strips;
- a head member connected to a first end of the elongate profiled strap element and defining at least one passage opening adapted to selectively receive a second free end of the elongate profiled strap element therethrough;
- at least one holding lug disposed on the elongate profiled strap element for selective embedded engagement with a corresponding annular groove defined in said associated corrugated object; and,
- an elastic locking element carried on the head member and defining an abutment surface and an engagement member, the locking element being positioned relative to the elongate profiled strap element and the head member so that when the elongate profiled strap element is moved through the at least one passage opening, the associated bundled object contacts the abutment surface and urges said engagement member towards said at least one passage opening for selectively engaging said set of transverse rung members to hold the elongate profiled strap element relative to the head member.

17. The plastic holding strap according to claim 16 further including a plurality of holding lugs disposed on the elongate profiled strap element for selective engagement with corresponding grooves defined in said associated corrugated object.

18. The plastic holding strap according to claim 17 wherein a first portion of said elongate profiled strap element defines a substantially convex region oriented towards said associated object.

19. The plastic holding strap according to claim 18 wherein said plurality of holding lugs are disposed on said profiled strap element in said substantially convex region and wherein the holding strap includes at least one secondary holding lug carried on a second portion of said elongate profiled strap element adjacent said substantially convex region.

20. The plastic holding strap according to claim 19 further including a holding element formed integrally with said head member, the holding element being adapted for selective connection onto an associated coarse thread bolt.

21. The plastic holding strap according to claim 16 wherein the at least one holding lug is disposed on a first portion of the profiled strap element having a width B greater than a width b of the remainder of the strap element.

22. The plastic holding strap according to claim 12 wherein the at least one holding lug is disposed on a first portion of the profiled strap element having a width B greater than a width b of the remainder of the strap element.

* * * * *